(12) United States Patent
Kaneko et al.

(10) Patent No.: US 7,075,745 B2
(45) Date of Patent: Jul. 11, 2006

(54) DISK DRIVE

(75) Inventors: Michihiro Kaneko, Tsurugashima (JP);
Koichi Nagaki, Tsurugashima (JP);
Tomo Watanabe, Tsurugashima (JP);
Keiichi Yamauchi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 405 days.

(21) Appl. No.: 09/839,539

(22) Filed: Apr. 23, 2001

(65) Prior Publication Data
US 2002/0021513 A1  Feb. 21, 2002

(30) Foreign Application Priority Data
Apr. 24, 2000  (JP) .............................. 2000-123263

(51) Int. Cl.
*G11B 21/02* (2006.01)

(52) U.S. Cl. ........................................................ 360/75

(58) Field of Classification Search .................. 360/69,
360/75; 318/560, 254, 280, 109, 678; 711/112;
342/357, 459; 455/3.06
See application file for complete search history.

(56) References Cited

U.S. PATENT DOCUMENTS

| | | | | |
|---|---|---|---|---|
| 4,885,517 A | * | 12/1989 | Pennock | 318/678 |
| 5,204,593 A | * | 4/1993 | Ueki | 318/254 |
| 5,258,695 A | * | 11/1993 | Utenick et al. | 318/138 |
| 5,289,369 A | * | 2/1994 | Hirshberg | 705/13 |
| 5,294,937 A | * | 3/1994 | Ostteen et al. | 342/459 |
| 5,374,933 A | * | 12/1994 | Kao | 342/357.13 |
| 5,384,524 A | * | 1/1995 | Romano | 318/569 |
| 5,463,261 A | * | 10/1995 | Skarda et al. | 307/131 |
| 5,473,238 A | * | 12/1995 | Latham et al. | 318/560 |
| 5,486,957 A | * | 1/1996 | Albrecht | 360/75 |
| 5,576,716 A | * | 11/1996 | Sadler | 342/357.07 |
| 5,666,495 A | * | 9/1997 | Yeh | 710/303 |
| 5,794,164 A | * | 8/1998 | Beckert et al. | 455/3.06 |
| 5,889,629 A | * | 3/1999 | Patton, III | 360/75 |
| 6,140,784 A | * | 10/2000 | Mazda | 318/280 |
| 6,141,173 A | * | 10/2000 | Kitazaki et al. | 360/75 |
| 6,204,629 B1 | * | 3/2001 | Rote et al. | 318/803 |
| 6,363,214 B1 | * | 3/2002 | Merello et al. | 360/75 |
| 6,396,652 B1 | * | 5/2002 | Kawachi et al. | 360/75 |
| 6,490,116 B1 | * | 12/2002 | Watanabe et al. | 360/75 |
| 6,546,456 B1 | * | 4/2003 | Smith et al. | 711/112 |
| 6,771,447 B1 | * | 8/2004 | Watanabe et al. | 360/69 |

FOREIGN PATENT DOCUMENTS

JP      07-312048      11/1995
JP      09-245428      9/1997

OTHER PUBLICATIONS www.interfacebus.com; Logic Threshold Voltage Levels.*

* cited by examiner

*Primary Examiner*—K. Wong
(74) *Attorney, Agent, or Firm*—McGinn IP Law Group, PLLC (57) ABSTRACT

In a disk drive apparatus for forcibly restoring a head to a retract position when a power voltage is greatly lowered, the head is moved in a direction toward the retract position when detecting a small decrease in the power voltage.

26 Claims, 8 Drawing Sheets

DISK DRIVE

BACKGROUND OF THE INVENTION

1. Technical Field

The present invention relates to a disk drive for playing or driving an information-recording disk, such as a magnetic disk.

2. Related Art

Although the hard disk drives (HDDs) have now being spread as external storage units for personal computers, price reduction has put forwarded as their record density increases. In the recent, there has been an advent of home-use electronic products having built-in HDDs. The HDDs are capable of storing video and music contents in quantity and hence the products utilizing them are placed into marketing one after another. It is expected to mount them upon the car audio products. The DVDs nowadays are in the mainstream in the field of car navigation systems. It is however expected of shift from now on into HDDs.

Figure 1:
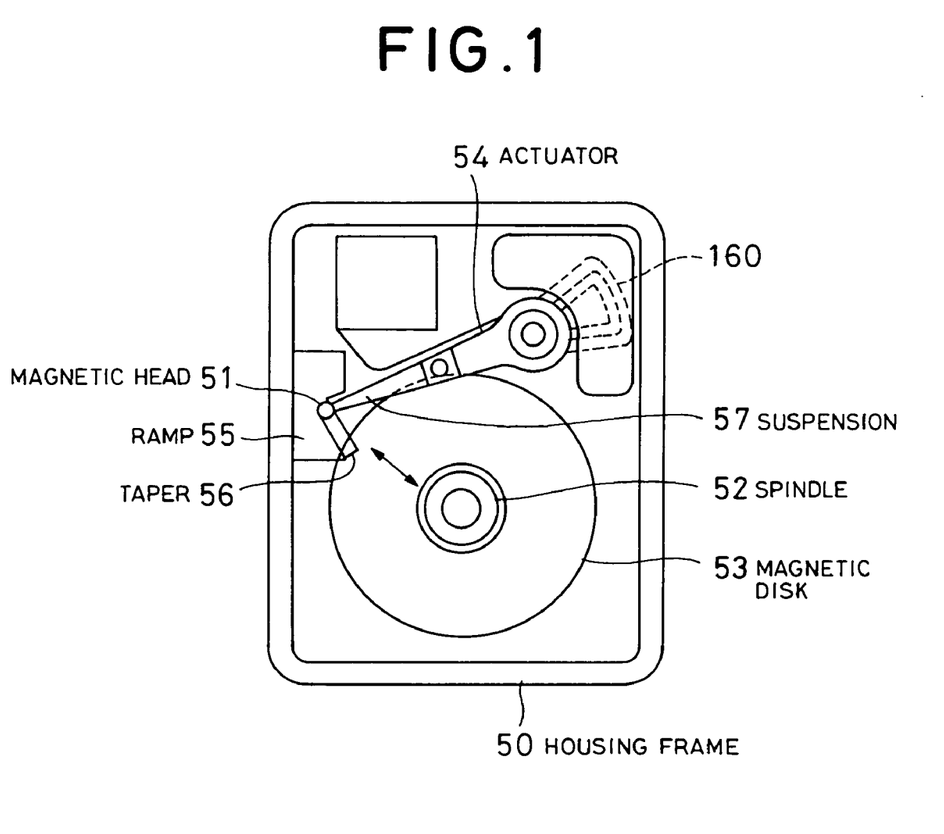
FIG. 1 is a plan view showing a basic structure of a ramp-load schemed HDD.

The basic structure of an HDD is shown in FIG. 1. The HDD adopts a ramp-loading scheme that a float head slider 51 arranged at a tip of the actuator 54 is mechanically floated from a surface of the magnetic disk.

As shown in the figure, the magnetic head 51 on the actuator 54 is arranged for radial movement (shown by arrows) of the magnetic disk 53 and positioned by a voice coil motor (VCM) 160. Although the magnetic head 51 is urged onto the surface of the magnetic disk 53 by an elastic force of the suspension 57, it is controlled to have a distance of several tens of μm to the disk surface of the magnetic disk 53 due to aerodynamic floating force acting upon the magnetic head 51 by a rotation of the magnetic disk 53. Meanwhile, the magnetic head 51 not in operation is positioned in a retracted position where it is on a taper 56 of a ramp 55 formed at one end of the housing frame 50.

Figure 2:
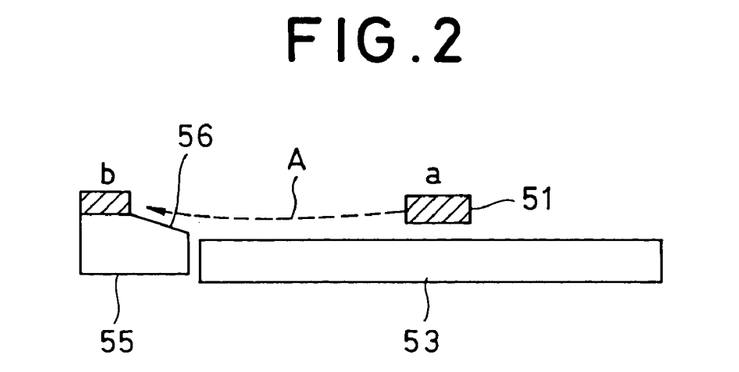
FIG. 2 is a sectional view for explaining a positional relationship between a ramp and a head in FIG. 1.

FIG. 2 shows a positional relationship in a sectional view between the magnetic head 51 and the ramp 55. As shown in the figure, the ramp 55 positioned close to the outer periphery of the magnetic disk 53 has a taper 56 given gradually higher than a surface of the magnetic disk 53 in a direction toward a radial outward of the disk. When reading information from or writing information to the magnetic disk 53 (i.e. in driving), the magnetic head 51 positions at a play position (in a position a) with a proper spacing to a main surface of the magnetic disk 53. In out of operation (or in unload), it gets over the taper 56 as shown by the arrow A to reach a retract position, or home position b, for waiting.

In the meanwhile, the foregoing HDD is given a function called emergency unload. The emergency unload function refers to a function that, where power voltage to the motor for driving the spindle 52 and magnetic head 51 is greatly decreased, the head 51 is forcibly moved to the retract position, in order to prevent a magnetic disk 53 from being damaged by the magnetic head 53. A power supply is required for carrying out the emergency unload. There is known an arrangement that, when the both power supplies fail, the emergency unloading is performed by the use of a reverse electromotive force, i.e. no-load electromotive force, caused by the inertial rotation of the spindle motor 52.

When the above-mentioned disk drive apparatus is used as a disk drive apparatus mounted on an engine-driven vehicle, a battery voltage greatly decreases at a startup of the engine and accordingly the emergency unload operation as the foregoing will be effected each time the engine is started up.

Figure 3:
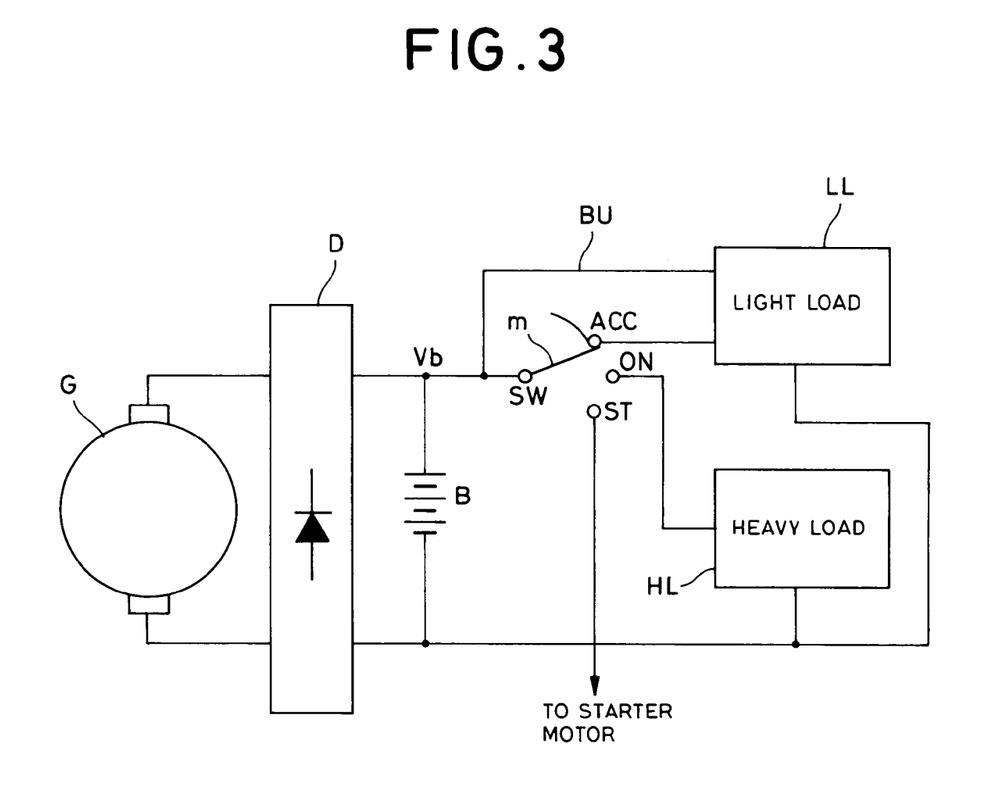
FIG. 3 is a block diagram showing a power supply system for an engine-driven vehicle.

FIG. 3 shows an example of a power supply circuit in an engine-driven vehicle. That is, an alternator G is driven by an engine, not shown. The alternating current supplied from the alternator G is rectified and smoothed by a rectifier D and then supplied to a battery B. The battery voltage Vb on the battery B is supplied to a movable contact m of an engine-key switch SW. The engine key switch SW has fixed terminals ACC, ON and ST. The battery voltage Vb passed through the terminal ACC is supplied as ACC power to a light load such as an audio unit. The battery voltage Vb passed through the terminal ON is supplied as ON power to a heavy load HL such as a power window actuator. The battery voltage Vb passed through the terminal ST is supplied as an MST voltage to a starter motor (not shown), to rotate the starter motor and start up the engine. On the other hand, the battery voltage Vb is supplied as a backup power to a light load LL through a line BU.

Figure 4A:
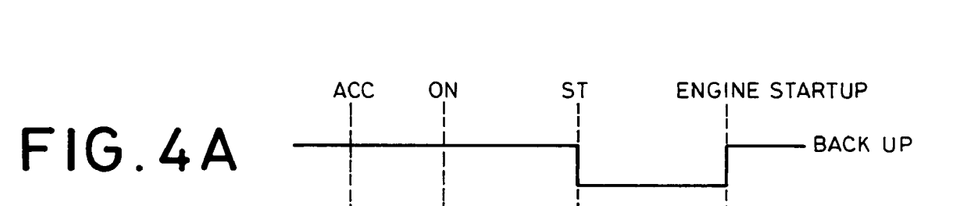
FIGS. 4A and 4B are timing charts for explaining changes in power voltages at a start of the engine of the engine-driven vehicle.
Figure 4B:
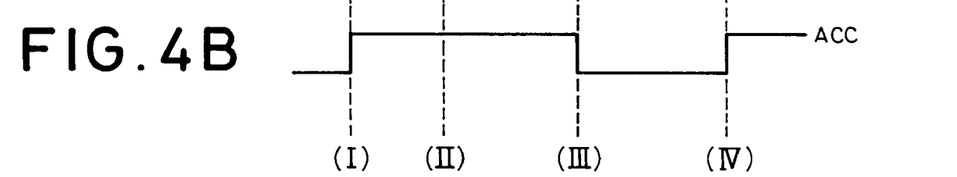

FIGS. 4A and 4B show voltage on the power supply lines how the voltages of BACKUP and ACC change at the engine start. FIG. 4A depicts a manner of change in power voltage of the backup power supply while FIG. 4B depicts a manner of change in the ACC power supply. Meanwhile, the timings (I), (II), (III) and (IV) respectively correspond to the key switch positions of the engine key. (I) represents a case the engine key is positioned at an ACC position to supply power to a light load such as an audio unit, (II) a case at an ON position to supply power to a heavy load, for example, of the power window actuator or the like, (III) a case at an ST position to supply power to the starter motor and (IV) a case the engine key is returned to the ON position During such engine start operations, there is a possibility that the backup power voltage decreases due to drop in the battery voltage. (period (III) (IV) in FIGS. 4A and 4B.)

Accordingly, where the HDD is mounted on an engine-driven vehicle, there is a high possibility that such emergency unload operation as mentioned above occur each time the engine is started up due to the drop in the power voltage because of the great amount of power consumption by the starter motor. Because the emergency unload is to forcibly move the head by utilizing the reverse electromotive force of the spindle motor as described above, there are increased occasions in the vehicular-mounted disk drive that the float head slider 51 collide with the taper 56 on the ramp 55 in the course of reaching the wait position b on the ramp 55 as compared to the case where the disk drive is mounted on a home-use device such as a home-use personal computer. In other words, the vehicular-mounted HDD requires increased endurance for the magnetic head 51. This circumstance is commonly problematic for the disk drive apparatuses for use with unstable power voltage.

SUMMARY OF THE INVENTION

The present invention has been made in view of the above circumstance, and it is an object of the present invention to provide a disk drive apparatus capable of avoiding the decrease in endurance even if it is used under an unstable power supply.

In order to solve the above problem, the present invention provides a disk drive apparatus for controlling, under supply of a predetermined rating voltage of power voltage, a head drive section to position a head in a radial direction of an information recording disk and carry out write and/or read operation of information while rotatively driving the information recording disk by a rotation drive motor, the disk drive apparatus including: a forcible restoring section for controlling the head drive section to forcibly bring the head to a retract position by no-load electromotive force due to the rotation drive motor when the power voltage goes below a first voltage level; and a normal restoring section for controlling the head drive section to move the head toward the retract position on the basis of the power voltage while the power voltage is smaller than the rating voltage but greater than the first voltage level.

DETAILED DESCRIPTION OF THE PREFERRED EMBODIMENT

Figure 5:
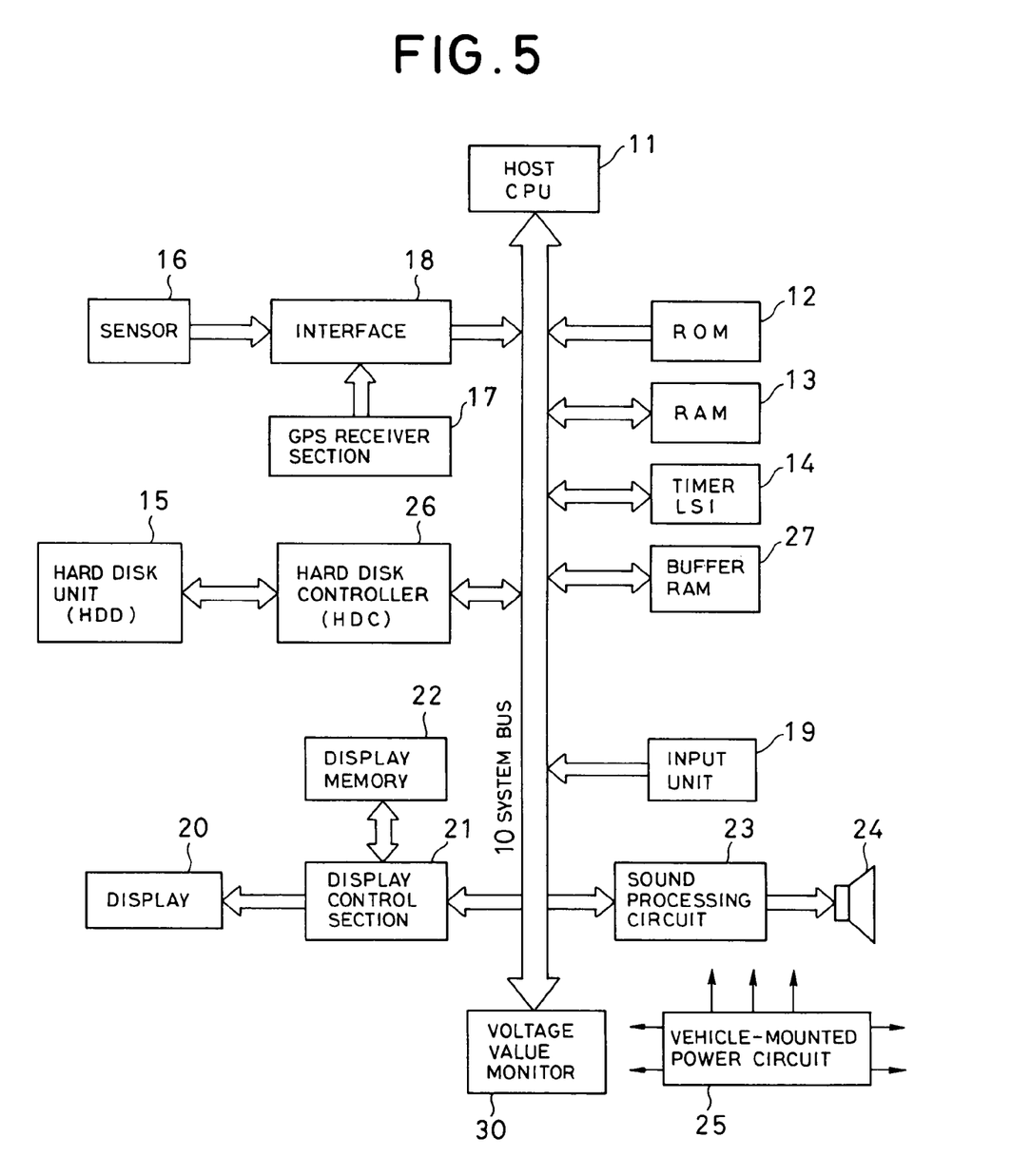
FIG. 5 is a block diagram showing a car navigation system including an HDD apparatus of the present invention.

FIG. 5 shows a car navigation system including an HDD according to the present invention. Herein, the HDD is used as a map information memory section for a car navigation system. It is now to be noted that the HDD according to the invention is used for a variety of devices but not limited to such car navigation. The car navigation system as illustrated has a host CPU 11 serving as a control core and configured with a ROM 12, a RAM 13, a timer LSI (14), an HDD 15, a sensor section 16, a GPS receiver section 17, an interface 18, an input device 19, a display 20, a display control section 21, a display memory 22, a sound processing circuit 23, a speaker 24, a power supply circuit 25, a hard disk controller (HDC) 26 and a backup RAM 27.

The host CPU 11 administers overall control of navigation including search for destination and route guide in cooperation with the display control section 21 depending upon a program stored in the ROM 12 and RAM 13, according to an instruction given from a user through the input device 19. In this case, utilized is geographical information available through the sensor section 16 and GPS receiver section 17. The timer LSI (14) has a time count value set programmable by the host CPU 11 and issues an interrupt at a time-up, thereby to initiate an interrupt process routine.

The HDC 26 administers format control of a magnetic disk loaded on the HDD 15 and, further, has functions as a host interface and an HDD interface.

The sensor section 16 refers to sensors needed in self-controlled traveling as a car navigation system and, for example, a vehicular speed sensor, a gyro-sensor or the like connected to a system bus 10 through the interface 18. The interface 18 is supplied also with an output of the GPS receiver section 17 to provide hybrid-traveling control based on GPS positioning and self-controlled traveling.

The display 20 is configured, for example, with a liquid crystal monitor to read in and display, through the display control section 21, a process content of geographical information or the like written in the display memory 22 by the host CPU 11.

The input device 19 is a remote control or console to be used as a GUI used to input commands or make communication with the navigation system through the display 20. The sound processing circuit 23 functions to generate a voice guide or as a GUI to dialogue with the navigation system by voice input. The voice guide is outputted through the speaker 24. The reference 25 is a vehicular power supply circuit and includes a backup power supply line and an ACC power supply line, as described above.

Figure 6:
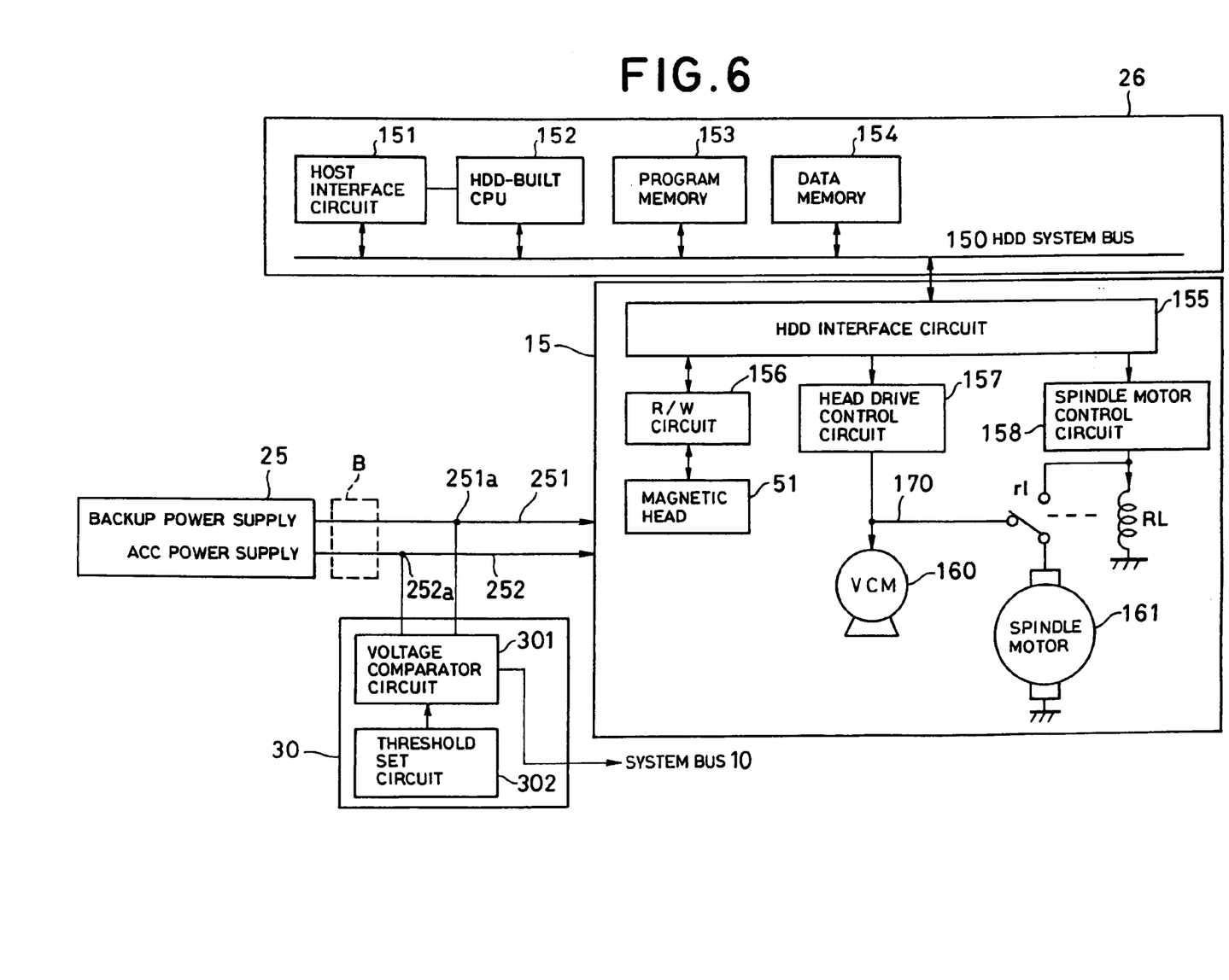
FIG. 6 is a block diagram of an HDD apparatus in the system of FIG. 5.

FIG. 6 shows a voltage monitor device 30 for detecting voltage values of the backup power and the ACC power of the HDD 15 and vehicular power supply circuit 25.

The vehicular power supply circuit 25 comprises a backup power source line 251 and an ACC power source line 252. The voltage monitor device 30 is formed with a voltage comparator circuit 301 and a threshold setting circuit 302.

The voltage monitor circuit 30 monitors respective voltage values of the powers supplied through the power supply lines 251 and 252 from the backup power supply and the ACC power supply. The threshold setting circuit 302 is set with a threshold value to detect voltage drop, the value of which is to be informed to the voltage comparator circuit 301.

The HDD 15 is configured by an CPU 152 built within the HDD as a core, a host interface circuit 151, a program memory 153, a data memory 154, an HDD interface circuit 155, an R/W (read/write) circuit 156, a head-drive control circuit 157, a spindle-motor control circuit 158, a magnetic head 51, a voice coil motor (VCM) 160 and a spindle motor 161.

The host interface 151, the HDD-built CPU 152, the program memory 153, the data memory 154 and the HDD interface circuit 155 are commonly connected to an HDD system bus 150.

The HDD-built CPU 152 receives a command (Seek, Read/Write, etc.) through the host interface circuit 151 from the CPU 11 shown in FIG. 5, to control the R/W circuit 156, head-drive control circuit 157 and spindle-motor control circuit 158 through the HDD interface circuit 155 according to a program stored in the program memory 153. The data to be read from and written to the magnetic disk 53 through the magnetic head 51 is under control of the R/W circuit 156. Meanwhile, the drive to the VCM 160 is under control of the head-drive control circuit 157. Furthermore, the rotation drive to the spindle motor 161 is under control of the spindle-motor control circuit 158. When, incidentally, both of the backup power voltage and the ACC power voltage drop, the reverse electromotive force caused by inertial rotation of the spindle motor 161 is supplied to the VCM 160 through the relay contact and line 170, providing the emergency unload.

Incidentally, a power switch exclusive for the HDD can be provided on the lines 251, 252 at an upstream of the monitor points 251a, 252a for the voltage monitor circuit 30, for example, at a position surrounded by a broken line B.

Figure 7A:
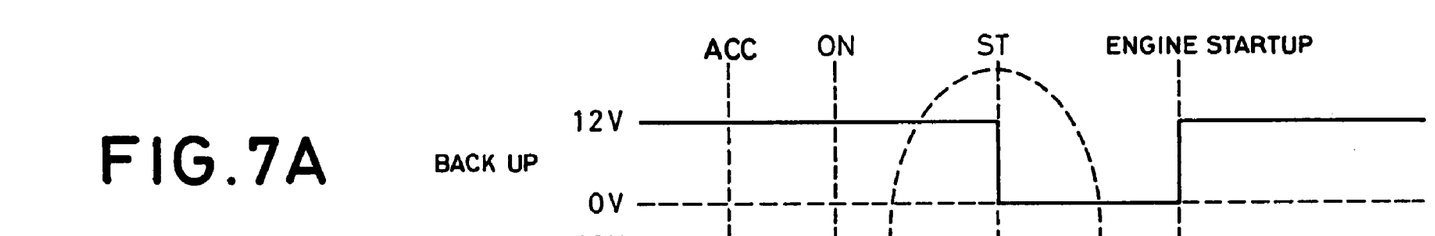
FIGS. 7A through 7D are timing charts showing changes in power voltages for an engine-driven vehicle.
Figure 7B:
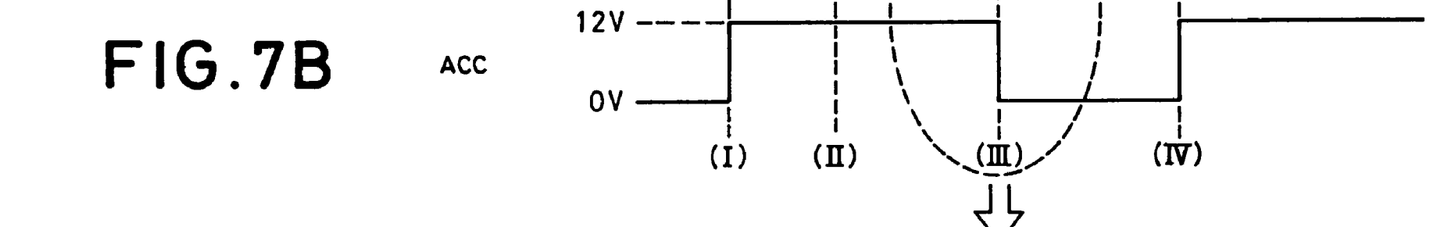
Figure 7C:
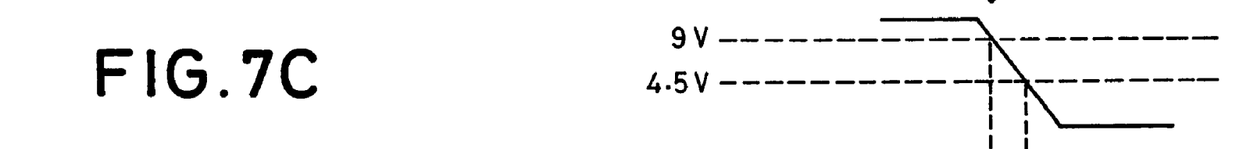
Figure 7D:
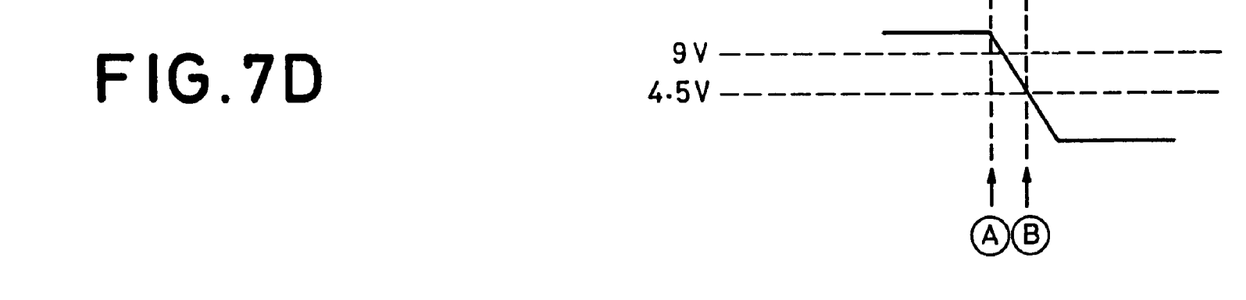

FIG. 7A and FIG. 7B are timing charts showing voltage waveforms of the respective power supplies at a startup of the vehicle engine.

FIG. 7A shows a voltage waveform of the backup power supplied through the power supply line 251, while FIG. 7B shows a voltage waveform of the ACC power supplied through the ACC power supply line 252. The voltage waveforms of the both power voltages are similar to the voltage waveforms shown in FIGS. 4A and 4B, and detailed explanations are herein omitted.

As described before, there is an observed phenomenon that the power voltage value decreases in the period of (III)–(IV) in FIGS. 4A and 4B because of startup current of the starter motor. The voltage waveform at the beginning of the voltage drop is as concretely shown in the circle of the figure, i.e. each power voltage is controlled to drop depicting a moderate curve and then returns without abrupt drop.

Accordingly, the present invention controls such that a voltage value at immediately before starting emergency unload (time A) is detected to perform normal unload operation upon detecting the voltage value. That is, where the normal power voltage or the ACC power voltage is given at 12V, the voltage value for starting normal unload is 9V and the voltage value for starting emergency unload is 4.5V, the voltage value on the backup power supply or the ACC power supply is monitored. When the voltage value becomes 9V (time A), normal unload is started to start moving the head to a retract-position direction. In the moving process, when the voltage value becomes 4.5V (time B), the circuits such as the host CPU 11 and the HDD-built CPU 152 are reset which results in the emergency unload.

Figure 8A:
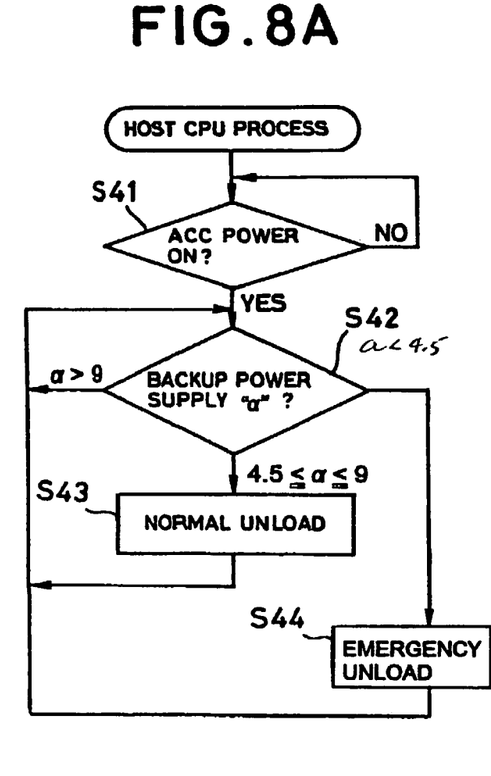
FIGS. 8A and 8B are flowcharts showing control operations in the car navigation system according to the present invention.
Figure 8B:
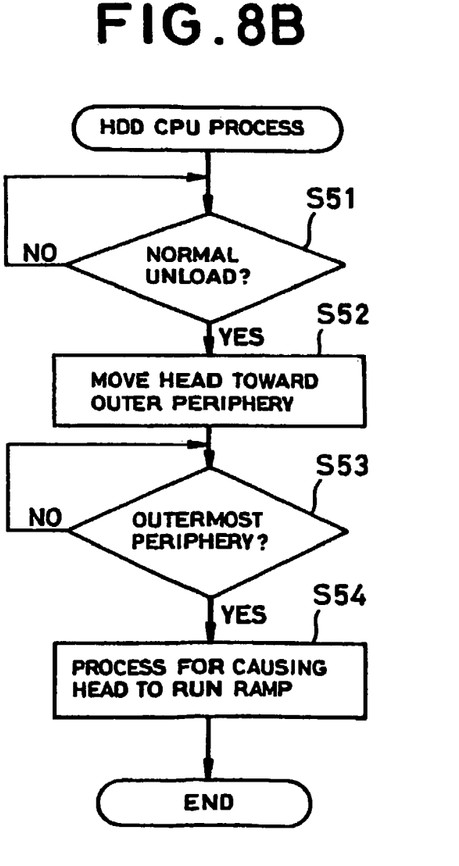

The above operation will now be explained with reference to FIGS. 8A and 8B. FIG. 8A shows a routine carried out by the host CPU 11 and FIG. 8B a process by the HDD-built CPU 152.

First, the host CPU 11 monitors whether the power voltage on the ACC power line varying interacting with a key switch is ON, or 12V, or not (step S41). When the ACC power is ON, power is supplied to the overall navigation system of FIG. 5, driving a spindle motor 161 of the HDD 15 to rotate. Next, the voltage value α of the backup power 251 is monitored (step S42). The above steps S41 and S42 are executed by monitoring an output signal from a voltage-value monitor circuit 301 shown in FIG. 6.

As a result of monitoring the voltage value on the backup power supply 251, when the voltage value α goes below 9V, the host CPU 11 instructs head normal unload to a head-drive control circuit 157 and the HDD-built CPU 152 instructs normal unload to the head drive circuit 157 (step S43). Thereafter, when the voltage value α goes below 4.5V, the system entirety including the host CPU 11 automatically turns into a reset state, the control on the magnetic head 51 by the head drive circuit 157 is suspended. In the HDD 15, a relay RL is restored to supply the reverse electromotive force of the spindle motor 161 to the VCM 160 through a break contact of a contact rl, effecting the emergency unload operation (step S44).

In this manner, the host CPU 11 monitors a voltage waveform of the backup power after tuning on the HDD power switch. When the backup power voltage is lowered, a normal-unload instruction is issued to the CPU 152 of the HDD controller 26.

Next, the HDD-built CPU 152 carries out the following process according to a control instruction by the host CPU 11. First, instructed for normal unload (step S51), the HDD-built CPU 152 decodes the instruction. If, at this moment, the HDD is within either the write or read operation mode, the CPU 152 causes to move the magnetic head 51 toward the outer periphery (step S52). Then, monitor is made on whether the magnetic head 51 has reached the outermost periphery or not (step S53). When reaching the outermost periphery is confirmed, a process is made to cause the magnetic head 51 to climb the ramp 55 (step S54).

If the both voltages of the backup power and ACC power drop below 4.5V and the emergency unload operation is effected, the magnetic head 51 is moved toward the outermost periphery by the reverse electromotive force of the spindle motor 161 so that is climbs the ramp 55.

In this manner, the emergency unload is effected via the normal unload when the backup voltage drops under the state where the ACC power is supplied.

The operation of the magnetic head in such a case will be explained with reference to FIGS. 9A and 9B.

Figure 9A:
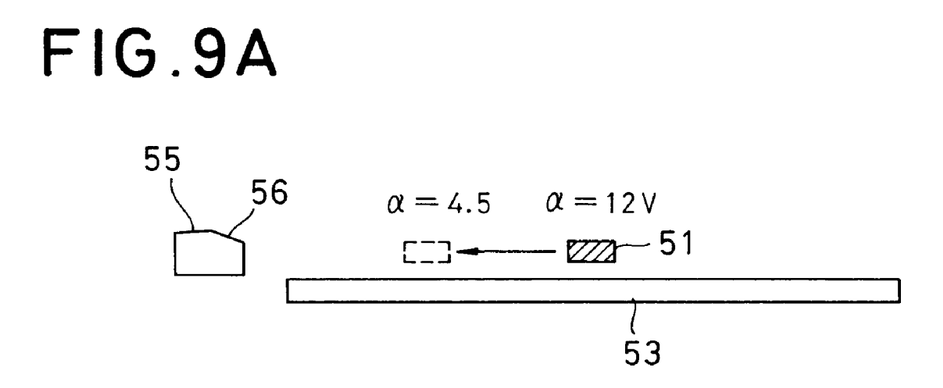
FIGS. 9A and 9B are sectional views showing a positional relationship between the disk and the head, for showing the operation carried out by the control operations shown by the flowcharts of FIGS. 8A and 8B.

First, the magnetic head 51 when the voltage value α of the backup power is a steady voltage of 12V is assumed in a position hatched in FIG. 9A. If in this position the backup power voltage value α goes below 9V, the normal unload is initiated. This moves the magnetic head 51 in a direction shown by the arrow in FIG. 9A. The movement of the magnetic head 51 is continued until the backup power voltage becomes 4.5V. In FIG. 9A, the backup power voltage is assumed to drop to 4.5V where the magnetic head 51 comes to a dot-lined position.

Figure 9B:
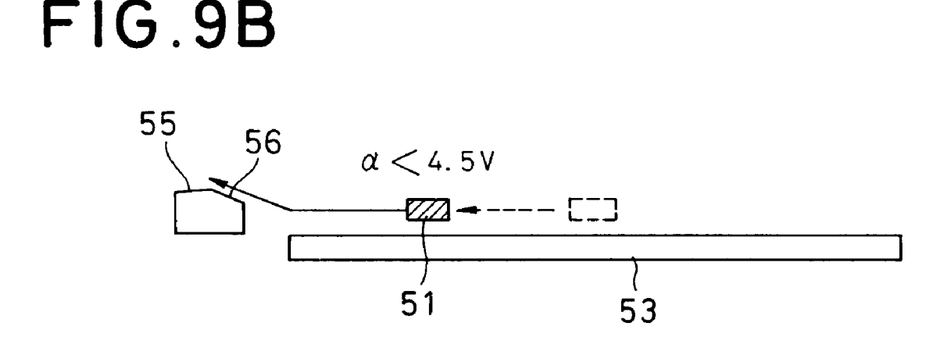

Next, when the backup power voltage value α becomes below 4.5V, the emergency unload is started (FIG. 9B). This moves the magnetic head 51 in a direction shown by the arrow in FIG. 9B. That is, the emergency unload is started from the hatched position of the magnetic head 51 in FIG. 9B and then the unload operation completes upon running over the ramp 55.

The magnetic head 51 collides with a taper 56 of the ramp 55, an impact degree of which is in proportion to a distance between the magnetic head 51 and the ramp 55, i.e. the impact degree is greater as the magnetic head 51 and the ramp 55 are distant farer. Consequently, where the normal unload is made immediately before the emergency unload, the magnetic head 51 is moved even a little toward the outer periphery thus relaxing the impact of collision between the magnetic head 51 and the ramp 55.

As explained above, the present invention moves the head in the direction toward the outer periphery when power voltage drop is detected in a range of no occurrence of emergency unload. Even when thereafter emergency unload is effected, the impact caused upon collision of the head with the taper of the ramp is relaxed thus prevent the lifetime of the HDD to be shortened.

Incidentally, the foregoing normal-unload operation by the HDD device is to be effected not only at an engine startup but also in an event of power-voltage drop after starting the engine.

As explained above, in the disk drive apparatus according to the present invention, detected is a voltage immediately before occurrence of the emergency unload caused by an abrupt decrease in the power voltage. When the voltage drop is detected, the magnetic head is first moved in a direction toward an outer periphery, and thereafter the emergency unload is carried out. This can relax the impact caused upon collision of the magnetic head with a taper of a ramp, thus enhancing endurance and improving reliability.

This application is based on a Japanese Patent Application No. 2000-123263 which is hereby incorporated by reference.

What is claimed is:

1. A disk drive apparatus for controlling, under supply of a power voltage having a predetermined rating voltage level, a head drive section to position a head in a radial direction of an information recording disk and carry out a write and/or read operation of information while rotatively driving the information recording disk by a rotation drive motor, said disk drive apparatus comprising:
- a voltage level monitor for monitoring the level of the power voltage with reference to each of an intermediate voltage level and a bottom voltage level, where the intermediate voltage level is lower than the rating voltage level, and the bottom voltage level is lower than the intermediate voltage level;
- a normal retract section for controlling said head drive section to cause said head to move in a direction toward a retract position, using the power voltage, in response to the monitored level of the power voltage being below the intermediate voltage level; and
- a forcible retract section for controlling said head drive section to forcibly bring the head to the retract position in response to the monitored level of the power voltage being below the bottom voltage level.

2. A disk drive apparatus according to claim 1, wherein said information recording disk comprises a magnetic disk.

3. A disk drive apparatus according to claim 2, wherein said head comprises a magnetic head, and said retract position includes a ramp provided for said magnetic head to run thereon.

4. A disk drive apparatus according to claim 1, wherein said power voltage comprises a voltage based on a battery voltage of a vehicle-mounted battery to be charged by a generator operating responsive to rotation of a vehicle-mounted engine.

5. A disk drive apparatus according to claim 4, further comprising a microprocessor for operating said forcible retract section and said normal retract section with said power voltage.

6. A disk drive apparatus according to claim 4, wherein said recording disk has navigation information recorded thereon, and said apparatus is mounted in a vehicle.

7. A disk drive apparatus according to claim 6, wherein only a battery voltage to said disk drive apparatus is monitored to detect variation in the level of the power voltage.

8. A disk drive apparatus according to claim 1, wherein said voltage level monitor monitors the level of the power voltage on each of a backup power supply line and an acessory power supply line from a vehicular power supply circuit.

9. A disk drive apparatus for controlling, under supply of a power voltage, a position of a read/write head in a radial direction of an information recording disk, to bring the head to a periphery of the information recording disk under low power conditions, said disk drive apparatus comprising:
- a rotation drive motor for rotating the information recording disk;
- a head drive section for driving the head over the information recording disk;
- a voltage level monitor for monitoring the level of the power voltage; and
- a controller, responsive to the monitored level of the power voltage being above a predetermined intermediate voltage level, for providing the power voltage to said rotation drive motor to rotate the information recording disk and to said head drive section to drive the head in a first direction, wherein:
said controller is responsive to the monitored level of the power voltage being equal to or less than the predetermined intermediate voltage level and above a predetermined bottom voltage level, for providing the power voltage to said head drive section to drive the head toward the periphery of the information recording disk, and
said controller is further responsive to the monitored level of the power voltage being equal to or less than the predetermined bottom voltage level, for providing reverse electromotive force from said rotation drive motor to said head drive section to drive the head to the periphery of the information recording disk.

10. A disk drive apparatus according to claim 9, further comprising an information recording disk having navigation information recorded thereon.

11. A disk drive apparatus as claimed in claim 9, further comprising a ramp adjacent the periphery of the disk for supporting the head when said head drive section is not driving the head.

12. A disk drive apparatus as claimed in claim 9, wherein the power voltage is provided from a vehicle-mounted generator, and said voltage level monitor is adapted to monitor the level of the voltage from the vehicle mounted generator.

13. A disk drive apparatus according to claim 9, wherein said voltage level monitor monitors the level of the power voltage on each of a backup power supply line and an accessory power supply line from a vehicular power supply circuit.

14. A disk drive apparatus, comprising:
- a rotation drive motor for rotating an information recording disk;
- a read/write head for reading and writing information on the information recording disk;
- a head drive motor for driving the head over the information recording disk;
- a voltage input for providing voltage to said rotation drive motor and to said head drive motor;
- a voltage level monitor for monitoring the level of the voltage provided by said voltage input; and
- a controller, responsive to the level of the monitored voltage being above a predetermined intermediate voltage level, for providing voltage from said voltage input to said rotation drive motor, to rotate the information recording disk, and to said head drive motor, to drive the head in a first direction, wherein:
said controller is further responsive to the level of the monitored voltage being equal to or less than the predetermined intermediate voltage level and above a predetermined bottom voltage level for providing voltage from said voltage input to said head drive motor to drive the head toward the periphery of the information recording disk, and
said controller is further responsive to the level of the monitored voltage being equal to or less than the predetermined bottom voltage level for providing reverse electromotive force from said rotation drive motor to said head drive motor to drive the head to the periphery of the information recording disk.

15. A disk drive apparatus according to claim 14, further comprising an information recording disk having navigation information recorded thereon.

16. A disk drive apparatus as claimed in claim 15, further comprising a ramp adjacent the periphery of the disk for supporting said head when said head drive section is not driving the head.

17. A disk drive apparatus as claimed in claim 14, wherein said voltage input is adapted to receive voltage from a vehicle-mounted generator.

18. A disk drive apparatus as claimed in claim 17, wherein said voltage level monitor is adapted to monitor the level of the voltage from the vehicle mounted generator.

19. A disk drive apparatus according to claim 14, wherein said controller comprises:
   a head drive control circuit for controlling said head drive motor to drive the head to a desired position over the information recording disk; and
   a processor for providing instructions to said head drive control circuit.

20. A disk drive apparatus according to claim 14, wherein said voltage level monitor monitors the level of the power voltage on each of a backup power supply line and an accessory power supply line from a vehicular power supply circuit.

21. A disk drive apparatus for controlling, under supply of a power voltage of a level equal to or smaller than a predetermined rating level, a head drive section to position a head in a radial direction of an information recording disk and carry out a write and/or read operation of information while rotatively driving the information recording disk by a rotation drive motor, said disk drive apparatus comprising:
   first means for monitoring the level of the power voltage with reference to each of an intermediate voltage level and a bottom voltage level, where the intermediate voltage level is lower than the rating voltage level, and the bottom voltage level is lower than the intermediate voltage level;
   second means for controlling said head drive section to cause said head to move in a direction toward a retract position using the power voltage in response to the monitored level of the power voltage being below the intermediate voltage level; and
   third means for controlling said head drive section to forcibly bring the head to the retract position in response to the monitored level of the power voltage being below the bottom voltage level.

22. A disk drive apparatus according to claim 21, wherein said first means monitors the level of the power voltage on each of a backup power supply line and an accessory power supply line from a vehicular power supply circuit.

23. A disk drive, comprising:
   a rotation drive motor for rotating an information recording disk;
   a head for reading and/or writing information onto and/or from the information recording disk;
   a voltage input for receiving a power voltage;
   a detector for detecting an abrupt decrease in the level of the power voltage;
   a normal retract section, responsive to detection of an abrupt decrease in the level of the power voltage to predetermined intermediate voltage level, lower than a rating level of the power voltage, for moving said head in a direction toward an outer periphery of the disk under power of voltage from said voltage input; and
   a forcible retract section, responsive to detection of an abrupt decrease in the level of the power voltage to a level less than a predetermined bottom voltage level, lower than the predetermined intermediate voltage level, for moving said head in the direction toward the outer periphery of the information recording disk under power of reverse electromotive force from said rotation drive motor.

24. A disk drive according to claim 23, wherein said detector detects an abrupt decrease in the level of the power supply voltage by monitoring the level of the voltage on each of a backup power supply line and an accessory power supply line from a vehicular power supply circuit.

25. A method of controlling a head drive section to position a head in a radial direction of an information recording disk and carry out a write and/or read operation of information, said method comprising:
   providing power voltage to a rotation drive motor to rotate the information recording disk;
   monitoring the level of the power voltage with reference to each of an intermediate voltage level and a bottom voltage level, where the bottom voltage level is lower than the intermediate voltage level;
   in response to the monitored level of the power voltage falling to a level equal to or less than the predetermined intermediate voltage level, moving the head toward a retract position under power of the power voltage; and
   in response to the monitored level of the power voltage falling to a level equal to or less than the predetermined bottom voltage level, forcibly moving the head to the retract position.

26. A method according to claim 25, wherein monitoring the level of the power voltage comprises monitoring the level of the voltage on each of a backup power supply line and an accessory power supply circuit.

* * * * *